(12) United States Patent
Gilbeck et al.

(10) Patent No.: US 11,953,337 B2
(45) Date of Patent: Apr. 9, 2024

(54) SYSTEM AND METHOD FOR ASSISTED POSITIONING OF TRANSPORT VEHICLES FOR MATERIAL DISCHARGE IN A WORKSITE

(71) Applicant: Deere & Company, Moline, IL (US)

(72) Inventors: Jon C. Gilbeck, Bettendorf, IA (US); Jonathan Spendlove, Dubuque, IA (US); Zimin W. Vilar, Dubuque, IA (US); Cory J. Brant, Hazel Green, WI (US)

(73) Assignee: Deere & Company, Moline, IL (US)

( * ) Notice: Subject to any disclaimer, the term of this patent is extended or adjusted under 35 U.S.C. 154(b) by 278 days.

(21) Appl. No.: 17/471,353

(22) Filed: Sep. 10, 2021

(65) Prior Publication Data
US 2022/0364873 A1 Nov. 17, 2022

Related U.S. Application Data

(60) Provisional application No. 63/187,801, filed on May 12, 2021.

(51) Int. Cl.
*G01C 21/34* (2006.01)
*G05D 1/00* (2006.01)
(Continued)

(52) U.S. Cl.
CPC ....... *G01C 21/3476* (2013.01); *G05D 1/0088* (2013.01); *G05D 1/0212* (2013.01);
(Continued)

(58) Field of Classification Search
CPC .. G01C 21/3476; G01C 21/20; G05D 1/0088; G05D 1/0212; G05D 1/0274;
(Continued)

(56) References Cited

U.S. PATENT DOCUMENTS

| 5,646,844 A | 7/1997 | Gudat et al. |
| 7,671,725 B2 | 3/2010 | Tsuji et al. |

(Continued)

FOREIGN PATENT DOCUMENTS

| WO | 2014166331 A1 | 10/2014 |
| WO | 2018021321 A1 | 2/2018 |

*Primary Examiner* — Vivek D Koppikar
*Assistant Examiner* — Dominick Mulder
(74) *Attorney, Agent, or Firm* — Gary L. Montle; Lucian Wayne Beavers; Patterson Intellectual Property Law, PC

(57) ABSTRACT

A system and method are provided for assisting transport vehicle drivers in material discharge for optimized working at a worksite by work machines such as dozers. A first user interface associated with the work machine accesses a map comprising three-dimensional data corresponding to at least a portion of the worksite. User input is received via the first user interface corresponding to desired discharge location(s) in the worksite to be worked, and output signals are generated for modifying a display on a second user interface associated with the transport vehicle, said modifications corresponding to the received user input and for directing the transport vehicle to the desired discharge locations. The two vehicles may share a common mapping unit such that input from the work machine is applied substantially in real-time at the transport vehicle. Alternatively, the inputs may be translated across mapping units to generate appropriate positioning instructions.

20 Claims, 8 Drawing Sheets

(51) Int. Cl.
  *G06F 3/0482* (2013.01)
  *E02F 9/26* (2006.01)
(52) U.S. Cl.
  CPC ......... *G05D 1/0274* (2013.01); *G06F 3/0482* (2013.01); *E02F 9/261* (2013.01); *G05D 2201/0202* (2013.01)
(58) Field of Classification Search
  CPC .......... G05D 2201/0202; G06F 3/0482; E02F 9/261; E02F 3/841; E02F 9/262; E02F 9/205; E02F 3/76; E02F 3/80
  USPC ....................................................... 701/426
  See application file for complete search history.

(56) References Cited

U.S. PATENT DOCUMENTS

| | | | |
|---|---|---|---|
| 7,949,449 B2 | 5/2011 | Koch et al. | |
| 8,626,406 B2 | 1/2014 | Schleicher et al. | |
| 8,843,311 B2 | 9/2014 | Takeda | |
| 8,954,252 B1 | 2/2015 | Urmson et al. | |
| 9,221,659 B2 | 12/2015 | Fukasu et al. | |
| 9,378,663 B2* | 6/2016 | Jensen | G09B 25/06 |
| 9,415,953 B2 | 8/2016 | Bonefas | |
| 9,567,731 B2 | 2/2017 | Darukhanavala et al. | |
| 9,712,791 B2 | 7/2017 | Kim et al. | |
| 9,908,385 B2 | 3/2018 | Chundrlik, Jr. et al. | |
| 9,946,451 B2 | 4/2018 | Kim et al. | |
| 10,479,354 B2 | 11/2019 | Posselius et al. | |
| 10,662,613 B2 | 5/2020 | Ready-Campbell et al. | |
| 10,801,177 B2 | 10/2020 | Ready-Campbell et al. | |
| 10,968,602 B2 | 4/2021 | Hendricks | |
| 10,990,245 B2* | 4/2021 | Marsolek | G07C 5/008 |
| 11,111,931 B2 | 9/2021 | Muraoka et al. | |
| 2013/0046525 A1 | 2/2013 | Ali et al. | |
| 2014/0214237 A1* | 7/2014 | Kini | E02F 9/205 701/2 |
| 2015/0189216 A1 | 7/2015 | Fukuchi et al. | |
| 2016/0231750 A1* | 8/2016 | Kawamata | G01C 21/3407 |
| 2017/0037593 A1 | 2/2017 | Naik et al. | |
| 2017/0068249 A1* | 3/2017 | Minowa | H04W 4/024 |
| 2017/0131722 A1 | 5/2017 | Hiramatsu et al. | |
| 2017/0135277 A1 | 5/2017 | Hiramatsu et al. | |
| 2018/0003856 A1* | 1/2018 | Hukkeri | G01S 15/931 |
| 2018/0035050 A1 | 2/2018 | Lu et al. | |
| 2018/0179732 A1 | 6/2018 | Bartsch et al. | |
| 2018/0210454 A1 | 7/2018 | Ready-Campbell et al. | |
| 2018/0284808 A1* | 10/2018 | Minagawa | G01C 21/3605 |
| 2019/0120647 A1* | 4/2019 | Shinkar | G01C 21/3691 |
| 2019/0227565 A1* | 7/2019 | Takeda | G05D 1/0278 |
| 2020/0063401 A1* | 2/2020 | Sherlock | E02F 9/2045 |
| 2020/0089230 A1* | 3/2020 | Oetken | G05D 1/0229 |
| 2020/0238881 A1 | 7/2020 | Hendricks | |
| 2020/0270848 A1* | 8/2020 | Knowles | E02F 9/265 |
| 2021/0148086 A1* | 5/2021 | Ready-Campbell | G05D 1/0274 |
| 2021/0272315 A1* | 9/2021 | Kawamoto | E02F 3/439 |
| 2021/0324603 A1* | 10/2021 | Marotz | E02F 9/262 |
| 2022/0010521 A1* | 1/2022 | Izumikawa | E02F 9/205 |
| 2022/0010522 A1* | 1/2022 | Shiratani | E02F 9/205 |
| 2022/0010523 A1* | 1/2022 | Izumikawa | E02F 9/2282 |
| 2022/0325498 A1* | 10/2022 | Knowles | E02F 9/2228 |

* cited by examiner

US 11,953,337 B2

SYSTEM AND METHOD FOR ASSISTED POSITIONING OF TRANSPORT VEHICLES FOR MATERIAL DISCHARGE IN A WORKSITE

FIELD OF THE DISCLOSURE

The present disclosure relates generally to work machines such as for example self-propelled work machines which include work implements mounted thereon, and to transport vehicles which carry and discharge material to be worked in association with the terrain by the work machines. More particularly, the present disclosure relates to systems and methods configured to assisted positioning of the transport vehicles for optimizing the work cycles of the work machines, particularly in a grading context.

BACKGROUND

Work machines of this type may for example include dozers, compact track loaders, excavator machines, skid steer loaders, and other work machines which grade or otherwise modify the terrain or equivalent working environment in some way and which may be self-propelled in nature. Work machines with ground-engaging blades may be most relevant in the context of the present disclosure with respect to their inherent capabilities for shaping and smoothing ground surfaces.

Conventional modes of communication between an operator of a dozer or other work machine and an operator of a transport vehicle are less than optimal in practice. A transport vehicle such as for example an articulated dump truck (ADT) may discharge (dump) loads of material at approximate locations where the driver believes is appropriate with respect to a given grade, but the accuracy of such determinations may be quite limited in many contexts.

As represented for example in FIG. 5, if a load 20 is discharged in front of the edge 22 of a grade 24, the driver of the work machine will conceivably need to redo the grade. In another example as presented in FIG. 6, if the load 20 is discharged behind the grade 24, the driver of the work machine will conceivably need to circle around and push back the load to fill in the grade, and then circle back again to continue spreading the material.

It would be desirable to provide assistance for the drivers of transport vehicles such that material could more consistently be discharged in preferred locations relative to the grade, such as for example where a lip of the discharged pile of material 20 slightly overlaps the edge 22 of the grade 24 as represented in FIG. 7.

BRIEF SUMMARY

The current disclosure provides an enhancement to conventional systems, at least in part by introducing a novel system and method for assisted material discharge, such that for example inputs regarding a preferred discharge location from a work machine can be implemented substantially in real-time for positioning instructions to a transport vehicle.

In one embodiment, a method is accordingly disclosed herein for method of assisted discharge by a transport vehicle of material to be worked at a worksite by work machine. A map may be accessed via a first user interface associated with the work machine, the map comprising three-dimensional data corresponding to at least a portion of a worksite to be worked. User input received via the first user interface may correspond to one or more desired discharge locations in the at least a portion of the worksite to be worked. Output signals may then be generated for modifying a display on a second user interface associated with the transport vehicle, said modifications corresponding to the received user input and for directing the transport vehicle to at least one of the one or more desired discharge locations.

In one exemplary aspect according to the above-referenced embodiment, the received user input may comprise at least one priority indicator with respect to each of the one or more desired discharge locations.

In another exemplary aspect according to the above-referenced embodiment, each of the first user interface and the second user interface are linked to a common mapping unit. User input provided with respect to the accessed map via the first user interface may be provided substantially in real-time with respect to the accessed map via the second user interface, wherein each of the first user interface and the second user interface share at least a common modified portion of a display thereon.

In another exemplary aspect according to the above-referenced embodiment, a route may be generated for the transport vehicle between a detected current location and the at least one of the one or more desired discharge locations, and wherein the generated output signals correspond at least in part to the generated route.

In another exemplary aspect according to the above-referenced embodiment, the user input may be received in association with a first mapping unit and translated into first position data in a coordinate system independent of the work machine. The first position data may then be converted into second position data in a coordinate system associated with the transport vehicle, wherein the second user interface displays the generated route using the second position data and in association with a second mapping unit.

In another exemplary aspect according to the above-referenced embodiment, the route may be generated based at least in part on received user input comprising at least one priority indicator with respect to each of the one or more desired discharge locations. The route may be generated further based at least in part on a detected payload weight.

In another exemplary aspect according to the above-referenced embodiment, the method further may comprise estimating a volume of material required to fill at least a portion of the worksite, and/or a volume of material discharged in one or more locations relative to the at least a portion of the worksite.

In another exemplary aspect according to the above-referenced embodiment, the method may further comprise estimating a volume of carryback material remaining in a loading container of the transport vehicle after a material discharge with respect to the one or more locations relative to the at least a portion of the worksite, and accounting for the estimated volume of carryback material in estimating the volume of material discharged in the one or more locations relative to the at least a portion of the worksite.

In another exemplary aspect according to the above-referenced embodiment, the method may further comprise automatically correcting at least one desired discharge location in the at least a portion of the worksite to be worked based on a detected edge of a grade in the at least a portion of the worksite, and further based on an estimated size of a load carried by the transport vehicle and/or the estimated volume of material required to fill the at least a portion of the worksite.

In another exemplary aspect according to the above-referenced embodiment, the method may further comprise estimating a volume of material added to the at least a portion of the worksite per transport vehicle load, and predicting a number of transport vehicle loads required to fill the at least a portion of the worksite.

In another exemplary aspect according to the above-referenced embodiment, the one or more desired discharge locations in the at least a portion of the worksite to be worked may be predicted based at least in part on the predicted number of transport vehicle loads required to fill the at least a portion of the worksite.

In another exemplary aspect according to the above-referenced embodiment, the volume of material required to fill at least a portion of the worksite is estimated at least in part by: collecting first data for at least a forward portion of the worksite via surface scans by at least a first sensor onboard the work machine; collecting second data for at least a traversed portion of the worksite via surface scans by at least a second sensor onboard the work machine; determining one or more characteristic values of a ground material in the work area based on at least first data for a specified area and corresponding second data for the specified area; and estimating the volume of material required to fill the at least a portion of the worksite based on at least one of the one or more characteristic values.

In another exemplary aspect according to the above-referenced embodiment, the volume of material required to fill at least a portion of the worksite is estimated at least in part by: collecting surface scan data for at least a forward portion of the worksite via at least a first sensor onboard the work machine; collecting position data for at least a traversed portion of the worksite via at least a second sensor onboard the work machine; determining one or more characteristic values of a ground material in the work area based on at least surface scan data for a specified area and corresponding position data for the specified area; and estimating the volume of material required to fill the at least a portion of the worksite based on at least one of the one or more characteristic values.

In another embodiment as disclosed herein, a system may be provided for assisted discharge by a transport vehicle of material to be worked at a worksite by a work machine. An image data source is configured to generate image data corresponding to at least a portion of a worksite to be worked, and may for example be mounted on the work machine. A first user interface is associated with the work machine and configured to selectively access and display a first map comprising three-dimensional data corresponding to the at least a portion of a worksite to be worked, and further to enable user input corresponding to one or more desired discharge locations in the at least a portion of the worksite to be worked. A second user interface is associated with the transport vehicle, and configured to display at least images corresponding to the at least a portion of a worksite to be worked. A controller is functionally linked to the image data source, the first user interface and the second user interface, and configured to generate output signals and otherwise direct the performance of steps in accordance with the above-referenced method embodiment and optionally with respect to one or more of the aspects further described therewith.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
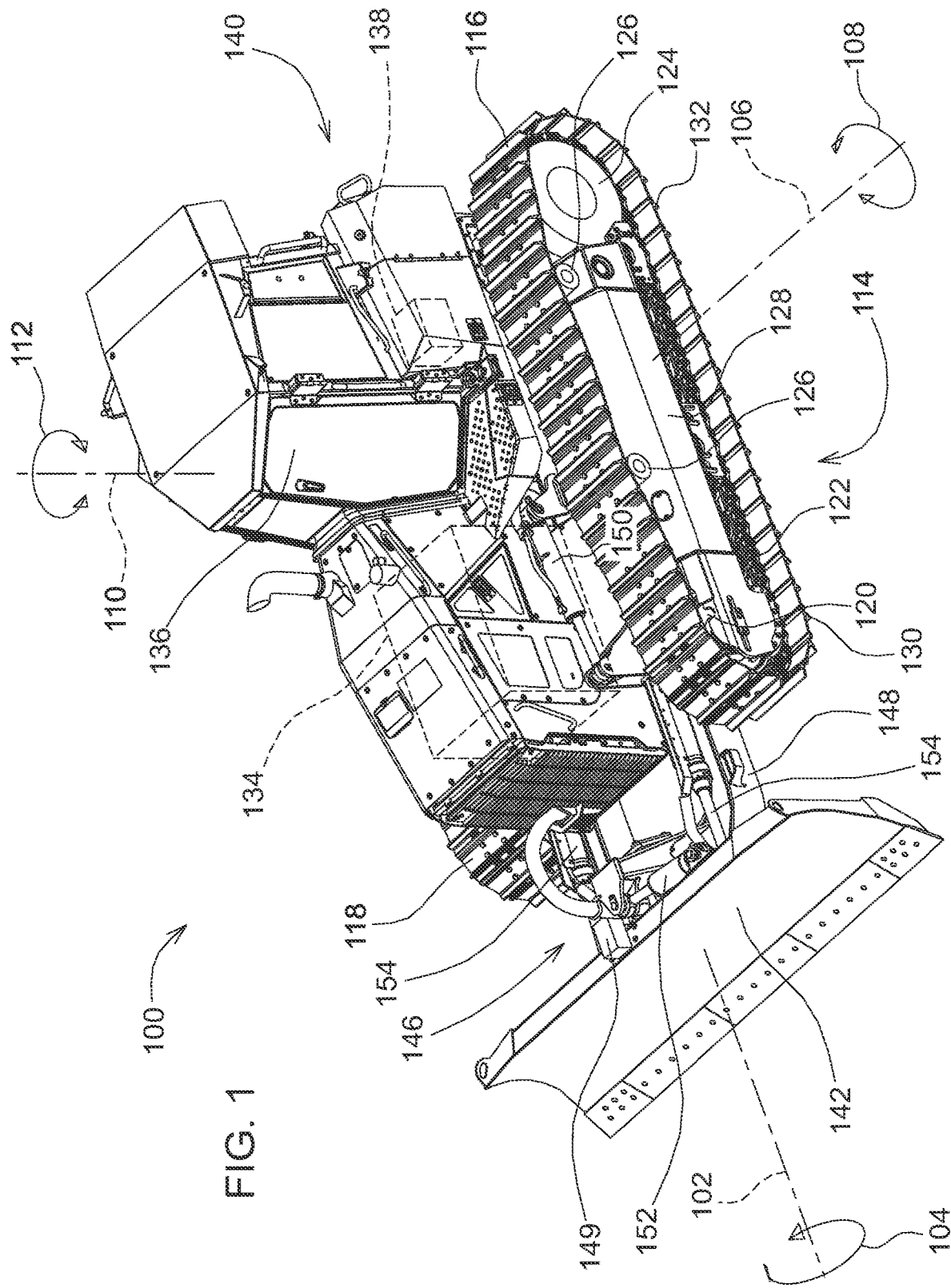
FIG. 1 is a perspective view of a tracked work machine incorporating an embodiment of a work machine and method as disclosed herein.

FIG. 1 is a perspective view of a work machine 100. In the illustrated embodiment, the work machine 100 is a crawler dozer, but may be any work machine with a ground-engaging blade or other work implement 1 such as a compact track loader, motor grader, scraper, skid steer, backhoe, and tractor, to name but a few examples. The work machine may be operated to engage the ground and grade, cut, and/or move material to achieve simple or complex features on the ground. While operating, the work machine may experience movement in three directions and rotation in three directions. A direction for the work machine may also be referred to with regard to a longitudinal direction 102, a latitudinal or lateral direction 106, and a vertical direction 110. Rotation for work machine 100 may be referred to as roll 104 or the roll direction, pitch 108 or the pitch direction, and yaw 112 or the yaw direction or heading.

An operator cab 136 may be located on the chassis 140. The operator cab and the work implement 142 may both be mounted on the chassis 140 so that at least in certain embodiments the operator cab faces in the working direction of the work implement 142, such as for example where the implement is front-mounted. A control station including a user interface 214 (not shown in FIG. 1) may be located in the operator cab 136. As used herein, directions with regard to work machine 100 may be referred to from the perspective of an operator seated within the operator cab 136: the left of work machine is to the left of such an operator, the right of work machine is to the right of such an operator, the front or fore of work machine 100 is the direction such an operator faces, the rear or aft of work machine is behind such an operator, the top of work machine is above such an operator, and the bottom of work machine is below such an operator.

The term "user interface" 214 as used herein may broadly take the form of a display unit 218 and/or other outputs from the system such as indicator lights, audible alerts, and the like. The user interface may further or alternatively include various controls or user inputs (e.g., a steering wheel, joysticks, levers, buttons) for operating the work machine 100, including operation of the engine, hydraulic cylinders, and the like. Such an onboard user interface may be coupled to a vehicle control system via for example a CAN bus arrangement or other equivalent forms of electrical and/or electro-mechanical signal transmission. Another form of user interface (not shown) may take the form of a display unit (not shown) that is generated on a remote (i.e., not onboard) computing device, which may display outputs such as status indications and/or otherwise enable user interaction such as the providing of inputs to the system. In the context of a remote user interface, data transmission between for example the vehicle control system and the user interface may take the form of a wireless communications system and associated components as are conventionally known in the art.

The illustrated work machine 100 further includes a control system including a controller 212 (further described below with respect to FIG. 3). The controller 212 may be part of the machine control system of the working machine, or it may be a separate control module. Accordingly, the controller 212 may generate control signals for controlling the operation of various actuators throughout the work machine 100, which may for example be hydraulic motors, hydraulic piston-cylinder units, electric actuators, or the like. Electronic control signals from the controller may for example be received by electro-hydraulic control valves associated with respective actuators, wherein the electro-hydraulic control valves control the flow of hydraulic fluid to and from the respective hydraulic actuators to control the actuation thereof in response to the control signal from the controller.

The controller 212 may include or be functionally linked to the user interface 214 and optionally be mounted in the operators cab 136 at a control panel.

The controller 212 is configured to receive input signals from some or all of various sensors 144, 149 associated with the work machine 100, which may include for example a set of one or more sensors 144 affixed to the chassis 140 of the work machine 100 and configured to provide signals indicative of, e.g., an inclination (slope) of the chassis, and/or a set of one or more sensors 149 affixed to the work implement 142 of the work machine 100 and configured to provide signals indicative of a position thereof. In alternative embodiments, such sensors may not be affixed directly to the chassis but may instead be connected to the chassis 140 through intermediate components or structures, such as rubberized mounts. Such sensors may be configured to provide at least a signal indicative of the inclination of the chassis 140 relative to the direction of gravity, or to provide a signal or signals indicative of other positions or velocities of the chassis, including its angular position, velocity, or acceleration in a direction such as the direction of roll 104, pitch 108, yaw 112, or its linear acceleration in a longitudinal direction 102, latitudinal direction 106, and/or vertical direction 110. Sensors 144 may be configured to directly measure inclination, or for example to measure angular velocity and integrate to arrive at inclination, and may typically, e.g., be comprised of an inertial measurement unit (IMU) mounted on the chassis 140 and configured to provide at least a chassis inclination (slope) signal, or signals corresponding to the scope of the chassis 140, as inputs to the controller 212. Such an IMU may for example be in the form of a three-axis gyroscopic unit configured to detect changes in orientation of the sensor, and thus of the chassis 140 to which it is fixed, relative to an initial orientation.

In other embodiments, the sensors may include a plurality of GPS sensing units fixed relative to the chassis 140 and/or the blade positioning unit, which can detect the absolute position and orientation of the work machine 100 within an external reference system, and can detect changes in such position and orientation.

The work machine 100 is supported on the ground by an undercarriage 114. The undercarriage 114 includes ground engaging units 116, 118, which in the present example are formed by a left track 116 and a right track 118 but may in certain embodiments be formed by alternative arrangements including wheeled ground engaging units, and provide tractive force for the work machine 100. Each track may be comprised of shoes with grousers that sink into the ground to increase traction, and interconnecting components that allow the tracks to rotate about front idlers 120, track rollers 122, rear sprockets 124 and top idlers 126. Such interconnecting components may include links, pins, bushings, and guides, to name a few components. Front idlers 120, track rollers 122, and rear sprockets 124, on both the left and right sides of the work machine 100, provide support for the work machine 100 on the ground. Front idlers 120, track rollers 122, rear sprockets 124, and top idlers 126 are all pivotally connected to the remainder of the work machine 100 and rotationally coupled to their respective tracks so as to rotate with those tracks. The track frame 128 provides structural support or strength to these components and the remainder of the undercarriage 114. In alternative embodiments, the ground engaging units 116, 118 may comprise, e.g., wheels on the left and right sides of the work machine.

Front idlers 120 are positioned at the longitudinal front of the left track 116 and the right track 118 and provide a rotating surface for the tracks to rotate about and a support point to transfer force between the work machine 100 and the ground. The left and right tracks 116, 118 rotate about the front idlers 120 as they transition between their vertically lower and vertically upper portions parallel to the ground, so approximately half of the outer diameter of each of the front idlers 120 is engaged with the respective left 116 or right track 118. This engagement may be through a sprocket and pin arrangement, where pins included in the left 116 and right tracks 118 are engaged by recesses in the front idler 120 so as to transfer force. This engagement also results in the vertical height of the left and right tracks 116, 118 being only slightly larger than the outer diameter of each of the front idlers 120 at the longitudinal front of the tracks. Forward engaging points 130 of the tracks 116, 118 can be approximated as the point on each track vertically below the center of the front idlers 120, which is the forward point of the tracks which engages the ground.

Track rollers 122 are longitudinally positioned between the front idler 120 and the rear sprocket 124 along the bottom left and bottom right sides of the work machine 100. Each of the track rollers 122 may be rotationally coupled to the left track 116 or the right track 118 through engagement between an upper surface of the tracks and a lower surface of the track rollers 122. This configuration may allow the track rollers 122 to provide support to the work machine 100, and in particular may allow for the transfer of forces in the vertical direction between the work machine and the ground. This configuration also resists the upward deflection of the left and right tracks 116, 118 as they traverse an upward ground feature whose longitudinal length is less than the distance between the front idler 120 and the rear sprocket 124.

Rear sprockets 124 may be positioned at the longitudinal rear of each of the left track 116 and the right track 118 and, similar to the front idlers 120, provide a rotating surface for the tracks to rotate about and a support point to transfer force between the work machine 100 and the ground. The left and right tracks 116, 118 rotate about the rear sprockets as they transition between their vertically lower and vertically upper portions parallel to the ground, so approximately half of the outer diameter of each of the rear sprockets 124 is engaged with the respective left or right track 116, 118. This engagement may be through a sprocket and pin arrangement, where pins included in the left and right tracks are engaged by recesses in the rear sprockets 124 to transfer force. This engagement also results in the vertical heights of the tracks being only slightly larger than the outer diameter of each of the rear sprockets 124 at the longitudinal back or rear of the respective track. The rearmost engaging point 132 of the tracks can be approximated as the point on each track vertically below the center of the rear sprockets, which is the rearmost point of the track which engages the ground. In this embodiment, each of the rear sprockets 124 may be powered by a rotationally coupled hydraulic motor so as to drive the left track 116 and the right track 118 and thereby control propulsion and traction for the work machine 100. Each of the left and right hydraulic motors may receive pressurized hydraulic fluid from a hydrostatic pump whose direction of flow and displacement controls the direction of rotation and speed of rotation for the left and right hydraulic motors. Each hydrostatic pump may be driven by an engine 134 (or equivalent power source) of the work machine and may be controlled by an operator in the operator cab 136 issuing commands which may be received by a controller 212 and communicated to the left and right hydrostatic pumps. In alternative embodiments, each of the rear sprockets may be driven by a rotationally coupled electric motor or a mechanical system transmitting power from the engine.

Top idlers 126 are longitudinally positioned between the front idlers 120 and the rear sprockets 124 along the left and right sides of the work machine 100 above the track rollers 122. Similar to the track rollers, each of the top idlers may be rotationally coupled to the left track 116 or the right track 118 through engagement between a lower surface of the tracks and an upper surface of the top idlers. This configuration may allow the top idlers to support the tracks for the longitudinal span between the front idler and the rear sprocket and prevent downward deflection of the upper portion of the tracks parallel to the ground between the front idler and the rear sprocket.

The undercarriage 114 is affixed to, and provides support and tractive effort for, the chassis 140 of the work machine 100. The chassis is the frame which provides structural support and rigidity to the work machine, allowing for the transfer of force between the work implement 142 and the left track 116 and right track 118. In this embodiment, the chassis is a weldment comprised of multiple formed and joined steel members, but in alternative embodiments it may be comprised of any number of different materials or configurations.

The blade of the present example is a work implement 142 which may engage the ground or material, for example to move material from one location to another and to create features on the ground, including flat areas, grades, hills, roads, or more complexly shaped features. In this embodiment, the work implement 142 of the work machine 100 may be referred to as a six-way blade, six-way adjustable blade, or power-angle-tilt (PAT) blade. The blade may be hydraulically actuated to move vertically up or down ("lift"), roll left or right ("tilt"), and yaw left or right ("angle"). Alternative embodiments may utilize a blade with fewer hydraulically controlled degrees of freedom, such as a 4-way blade that may not be angled or actuated in the direction of yaw 112.

The work implement 142 is movably connected to the chassis 140 of the work machine 100 through a linkage 146 which supports and actuates the blade and is configured to allow the blade to be lifted (i.e., raised or lowered in the vertical direction 110) relative to the chassis. The linkage 146 includes a c-frame 148, a structural member with a C-shape positioned rearward of the blade, with the C-shape open toward the rear of the work machine 100. The blade may be lifted (i.e., raised or lowered) relative to the work machine 100 by the actuation of lift cylinders 150, which may raise and lower the c-frame 148. The blade may be tilted relative to the work machine 100 by the actuation of a tilt cylinder 152, which may also be referred to as moving the blade in the direction of roll 104. The blade may be angled relative to the work machine 100 by the actuation of angle cylinders 154, which may also be referred to as moving the blade in the direction of yaw 112. Each of the lift cylinders 150, tilt cylinder 152, and angle cylinders 154 may be a double acting hydraulic cylinder.

Figure 3:
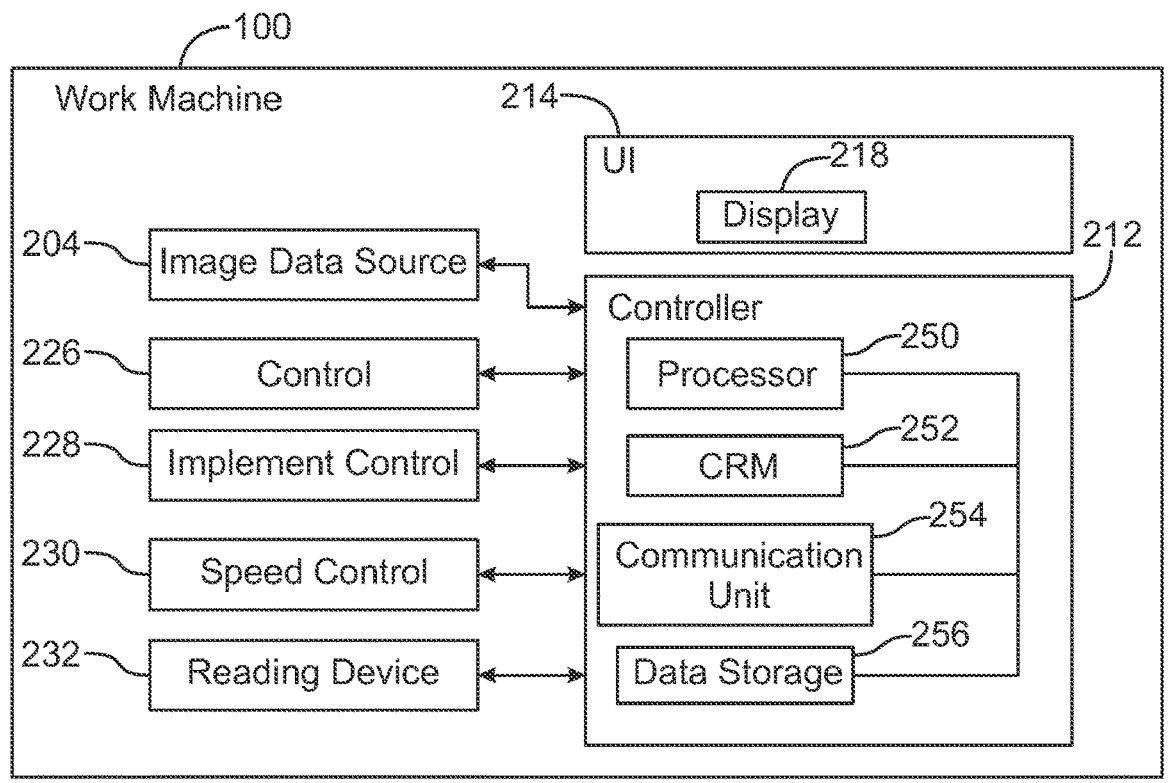
FIG. 3 is a block diagram representing an exemplary control system for the work machine according to an embodiment of a system as disclosed herein.

As schematically illustrated in FIG. 3, the work machine 100 in an embodiment as disclosed herein includes a control system including a controller 212. The controller 212 may be part of the machine control system of the work machine 100, or it may be a separate control module.

As referenced above, the controller 212 is configured to receive input signals from some or all of various image data sources 204 such as cameras and collectively defining an imaging system. The image data sources 204 may include video cameras configured to record an original image stream and transmit corresponding data to the controller 212. In the alternative or in addition, the image data sources 204 may include one or more of an infrared camera, a stereoscopic camera, a PMD camera, or the like. One of skill in the art may appreciate that high resolution light detection and ranging (LiDAR) scanners, radar detectors, laser scanners, and the like may be implemented as image data sources within the scope of the present disclosure. The number and orientation of said image data sources 204 may vary in accordance with the type of work machine 100 and relevant applications, but may at least be provided with respect to an area in a travelling direction of the work machine 100 and configured to capture image data associated with surroundings including for example a target discharge position proximate the work machine 100.

The position and size of an image region recorded by a respective camera as an image data source 204 may depend on the arrangement and orientation of the camera and the camera lens system, in particular the focal length of the lens of the camera. One of skill in the art may further appreciate that image data processing functions may be performed discretely at a given image data source if properly configured, but also or otherwise may generally include at least some image data processing by the controller or other downstream data processor. For example, image data from any one or more image data sources may be provided for three-dimensional point cloud generation, image segmentation, object delineation and classification, and the like, using image data processing tools as are known in the art in combination with the objectives disclosed.

Various sensors may collectively define an object detection system, alone or in combination with one or more aforementioned sensors for improved data collection, various examples of which may include ultrasonic sensors, laser scanners, radar wave transmitters and receivers, thermal sensors, imaging devices, structured light sensors, other optical sensors, and the like. The types and combinations of sensors for obstacle detection may vary for a type of work machine, work area, and/or application, but generally may be provided and configured to optimize recognition of objects proximate to, or otherwise in association with, a determined working area of the work machine and/or a transport vehicle 10 therein.

The controller 212 of the work machine 100 may be configured to produce outputs, as further described below, to a user interface 214 associated with a display unit 218 for display to the human operator. The controller 212 may be configured to receive inputs from the user interface 214, such as user input provided via the user interface 214. Not specifically represented in FIG. 3, the controller 212 of the work machine 100 may in some embodiments further receive inputs from and generate outputs to remote devices associated with a user via a respective user interface, for example a display unit with touchscreen interface. Data transmission between for example the vehicle control system and a remote user interface may take the form of a wireless communications system and associated components as are conventionally known in the art. In certain embodiments, a remote user interface and vehicle control systems for respective work machines 100 may be further coordinated or otherwise interact with a remote server or other computing device for the performance of operations in a system as disclosed herein.

The controller 212 may in various embodiments, as part of the control system of FIG. 3 and further in line with the above-referenced disclosure, be configured to generate control signals for controlling the operation of respective actuators, or signals for indirect control via intermediate control units, associated with a machine steering control system 226, a machine implement control system 228, and an engine speed control system 230. The control systems 226, 228, 230 may be independent or otherwise integrated together or as part of a machine control unit in various manners as known in the art. The controller 212 may for example generate control signals for controlling the operation of various actuators, such as hydraulic motors or hydraulic piston-cylinder units (not shown), and electronic control signals from the controller 212 may actually be received by electro-hydraulic control valves associated with the actuators such that the electro-hydraulic control valves will control the flow of hydraulic fluid to and from the respective hydraulic actuators to control the actuation thereof in response to the control signal from the controller 212.

A reading device 232 as conventionally known in the art such as for example an RFID device, barcode scanner, or the like may further be provided and communicatively linked to the controller 212 for obtaining readable information associated with a particular transport vehicle 10.

The controller 212 includes or may be associated with a processor 250, a computer readable medium 252, a communication unit 254, and data storage 256 such as for example a database network. It is understood that the controller 212 described herein may be a single controller having some or all of the described functionality, or it may include multiple controllers wherein some or all of the described functionality is distributed among the multiple controllers.

Various operations, steps or algorithms as described in connection with the controller 212 can be embodied directly in hardware, in a computer program product such as a software module executed by the processor 250, or in a combination of the two. The computer program product can reside in RAM memory, flash memory, ROM memory, EPROM memory, EEPROM memory, registers, hard disk, a removable disk, or any other form of computer-readable medium 252 known in the art. An exemplary computer-readable medium 252 can be coupled to the processor 250 such that the processor 250 can read information from, and write information to, the medium 252. In the alternative, the medium 252 can be integral to the processor 250. The processor 250 and the medium 252 can reside in an application specific integrated circuit (ASIC). The ASIC can reside in a user terminal. In the alternative, the processor 250 and the medium 252 can reside as discrete components in a user terminal.

The term "processor" 250 as used herein may refer to at least general-purpose or specific-purpose processing devices and/or logic as may be understood by one of skill in the art, including but not limited to a microprocessor, a microcontroller, a state machine, and the like. A processor 250 can also be implemented as a combination of computing devices, e.g., a combination of a DSP and a microprocessor, a plurality of microprocessors, one or more microprocessors in conjunction with a DSP core, or any other such configuration.

The communication unit 254 may support or provide communications between the controller 212 and external communications units, systems, or devices, and/or support or provide communication interface with respect to internal components of the work machine 100. The communications unit may include wireless communication system components (e.g., via cellular modem, WiFi, Bluetooth or the like) and/or may include one or more wired communications terminals such as universal serial bus ports.

The data storage 256 as further described below may, unless otherwise stated, generally encompass hardware such as volatile or non-volatile storage devices, drives, electronic memory, and optical or other storage media, as well as in certain embodiments one or more databases residing thereon.

Figure 2:
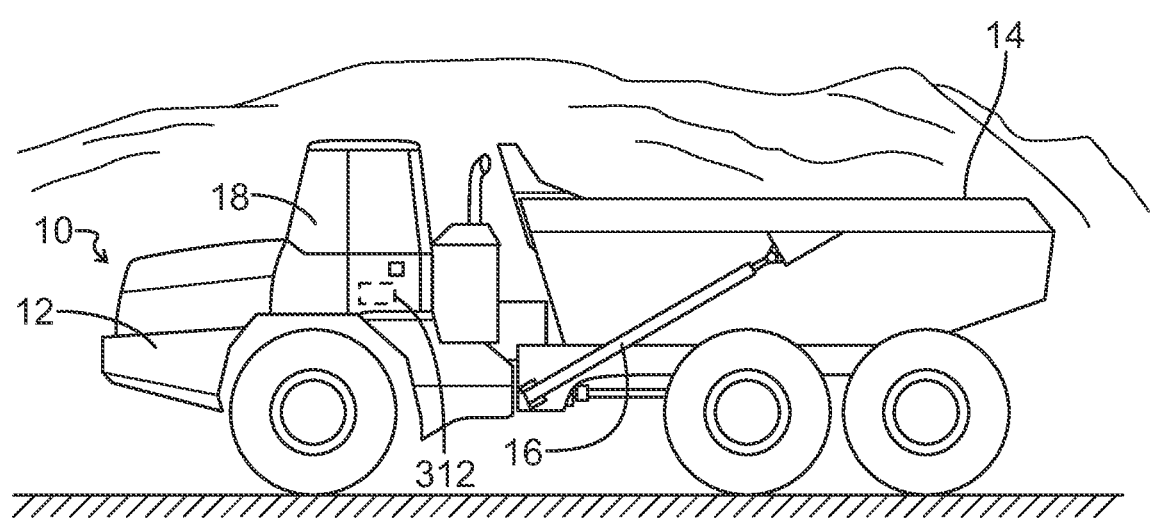
FIG. 2 is a side view of a transport vehicle according to a system and method as disclosed herein.

An articulated dump truck 10 as representing a transport vehicle 10 in FIG. 2 may include a plurality of wheels and associated axles, and a frame 12 supporting a loading container 14 (e.g., truck bed) having for example a loading surface at the bottom of an interior area surrounded by sidewalls, and a top edge at least part of which may typically be in parallel with the ground surface. A hydraulic piston-cylinder unit 16 may be coupled between the frame 12 and the loading container 14 and configured to selectively extend and raise/pivot the loading container 14 rearward to a dumping position, and to retract and lower/pivot the loading container forward from the dumping position to a travel and loading position (as shown). An operator cab 18 of the transport vehicle 10 may be located on the frame 12, wherein directions with regard to the transport vehicle 10 may be referred to from the perspective of an operator seated within the operator cab 18; the left of the transport vehicle is to the left of such an operator, the right of the transport vehicle is to the right of such an operator, a front-end portion (or fore) of the transport vehicle is the direction such an operator faces, a rear-end portion (or aft) of the transport vehicle is behind such an operator, a top of the transport vehicle is above such an operator, and a bottom of the transport vehicle below such an operator.

A controller 312 for the truck 10 may in some embodiments comprise or otherwise be associated with an operator interface in the operator's cab 18, as further described below.

An image data source 304 (not shown in FIG. 2) may be mounted on the transport vehicle 10 in accordance with the present disclosure. The location of the image data source 304 may be chosen such that a field of view thereof encompasses surroundings of the transport vehicle 10 and preferably at least the loading container 14 of the transport vehicle 10 during at least a portion of a material discharge operation wherein the surface of the loading container is pivoted for discharge of material loaded herein, and may further preferably be chosen such that the field of view encompasses at least a bottom surface of the loading container 14. In some embodiments, a plurality of image data sources 304 or an image data source 304 that is moveable or reconfigurable in position may be provided to enable stitching together multiple images for an overhead (i.e., birds-eye) view of the transport vehicle and associated surroundings.

Figure 4:
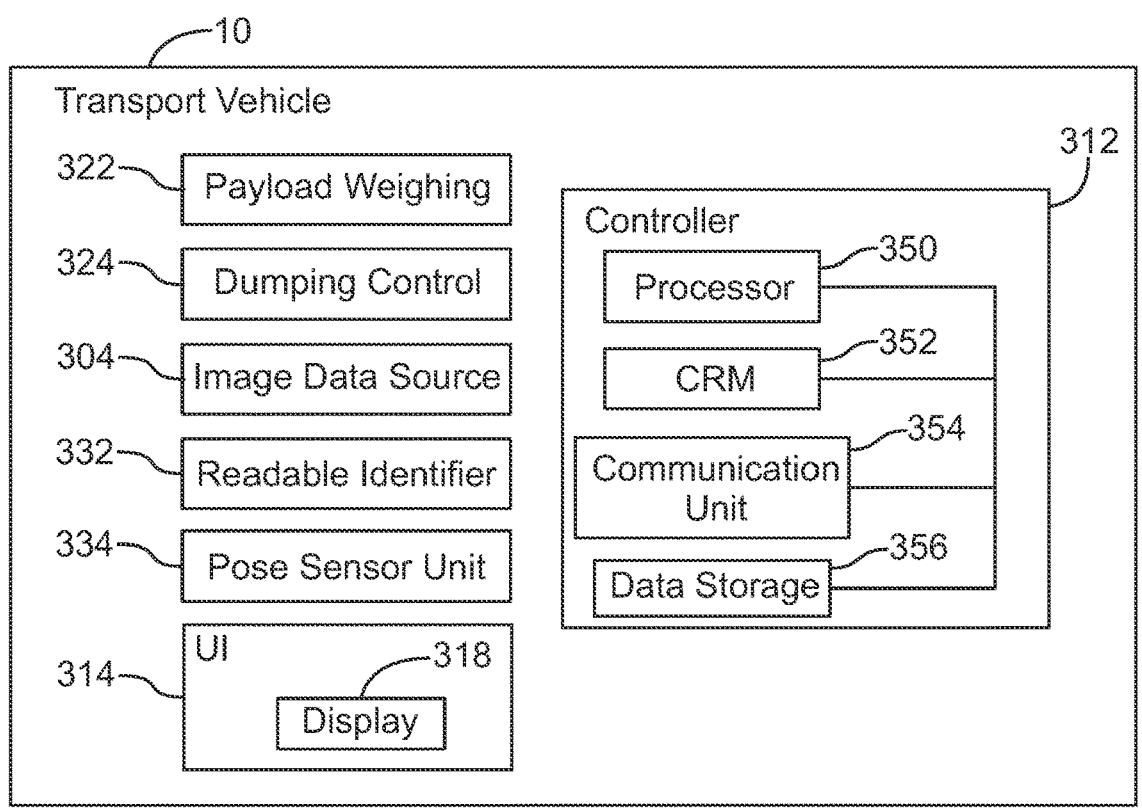
FIG. 4 is a block diagram representing an exemplary control system for the transport vehicle according to an embodiment of a system as disclosed herein.
Figure 5:
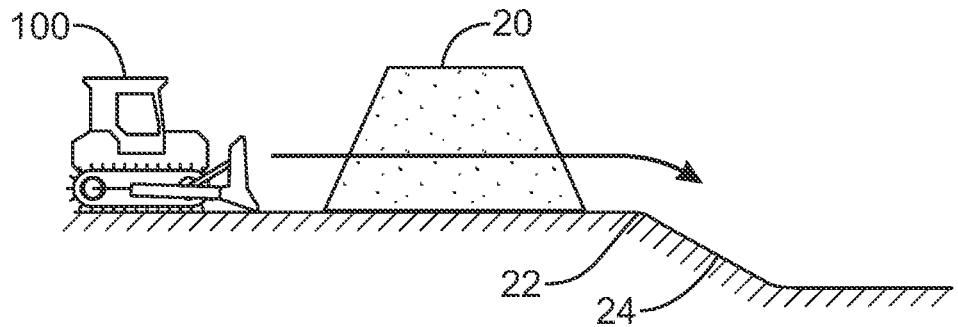
FIG. 5 is a graphical diagram representing a pile of material discharged too far in front of the grade in an undesirable fashion.
Figure 6:
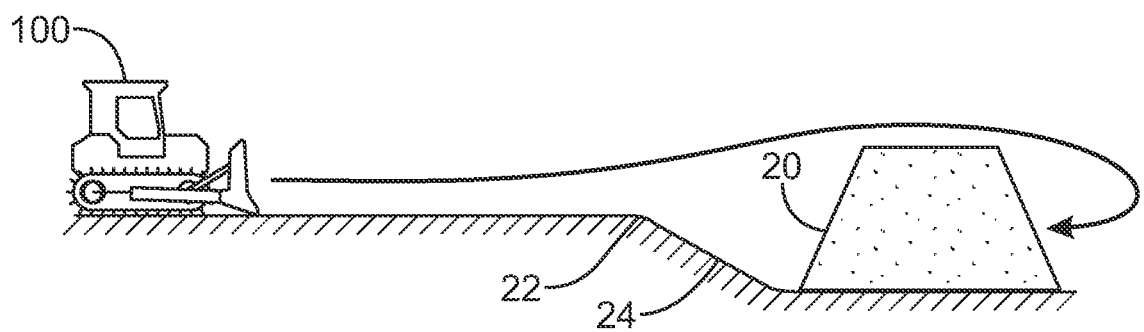
FIG. 6 is a graphical diagram representing a pile of material discharged too far behind the grade in an undesirable fashion.

As schematically illustrated in FIG. 4, in certain embodiments of a system as disclosed herein a transport vehicle 10 may include a control system including a controller 312. The controller 312 may be part of a vehicle control system of the transport vehicle 10, or it may be a separate control module.

The controller 312 of a respective transport vehicle 10 may be configured to receive input signals corresponding to a measured payload value such as for example a payload weight from a payload weighing unit 322 as is conventionally known in the art for certain articulated dump trucks. The controller 312 may further integrate or otherwise communicate with a dumping control system 324 to selectively direct the operation of the hydraulic piston-cylinder unit 16 for articulating the loading container 14 between a loading/transport position and a dumping/discharge position. A steering control system 330 may be utilized as further described below for at least an autonomous mode, and may further include or otherwise be supplemented with speed control, braking control, or the like for a more fully autonomous implementation. The transport vehicle 10 may further comprise a barcode or otherwise generate another form of machine-readable identifier 332 such as for example an RFID signal via a transceiver for communicating readable information to a work machine 100 or the like. A pose sensor unit 334 may be provided to detect a particular pose of at least the loading container 14 of the transport vehicle 10, for example to detect a work state of the transport vehicle 10 wherein a material carryback detection/estimation procedure is to be carried out to determine a volume of material carryback after the material has theoretically been discharged.

The controller 312 of a respective transport vehicle 10 may be configured to produce outputs, as further described below, to the user interface 314 associated with a display unit 318 for display to the human operator. The controller 312 may be configured to receive inputs from the user interface 314, such as user input provided via the user interface 314.

The controller 312 of a respective transport vehicle 10 may further include or be associated with a processor 350, a computer readable medium 352, a communication unit 354, and data storage 356 such as for example a database network. It is understood that the controller 312 described herein may be a single controller having some or all of the described functionality, or it may include multiple controllers wherein some or all of the described functionality is distributed among the multiple controllers.

An embodiment of a method 400 of the present disclosure may now be described with further reference to FIGS. 8-10.

In a first step 420, the method 400 may be initiated upon detecting the transition from a loading stage to a discharging (dumping) stage for a particular transport vehicle 10. The controller 312 for the transport vehicle may determine that the transport vehicle is in motion from a loading area to a prospective discharge (dumping) area in a worksite, for example based on values obtained from a payload weighing unit 322 further in view of vehicle speed inputs.

In a second step 430, a work machine 100 such as for example a tracked dozer may include a first user interface 214 that is configured to selectively access a map comprising three-dimensional data corresponding to at least a portion of a worksite to be worked. In one example, an onboard display unit 218 includes visual information corresponding to the worksite map, as well as providing interface tools such as touchscreen inputs in order for the operator to select one or more areas as target discharge locations 30 on the worksite map where it is preferred that material be discharged by the transport vehicle 10. In certain embodiments, the user interface 214 may enable further inputs such as for example varying levels of priority (e.g., closest, lowest) with respect to each of the one or more selected areas.

In an embodiment, the user interface 214 may be configured to display a first image layer associated with real-time inputs from an image data source 204 mounted on the work machine 100 and corresponding to surroundings of the work machine, and to further display a second image layer associated with inputs from the accessed map, wherein the second image layer comprises an overlay or superposed visual elements with respect to the first image layer and corresponding to three-dimensional information regarding the worksite. In an embodiment, the second image layer (or a third image layer) may further comprise visual elements corresponding to user inputs (e.g., breadcrumbs) that correspond to selected target discharge locations 30 in the context of the displayed surroundings and three-dimensional information.

In an embodiment, the user interface 214 for receiving user input corresponding to the preferred discharge location 30 does not need to be mounted onboard the work machine 100 but may be provided on a mobile computing device or the like, whether associated with an operator of the work machine 100 or other authorized user associated with the worksite.

Upon receiving the user input, the system and method 400 may in some embodiments continue (i.e., step 440) by modifying the selected discharge locations with respect to an edge of the grade. For example, an operator selection for one location relative to the edge of a grade may be automatically corrected by the system based on an estimated size of a load 20 of material being carried to the site by the transport vehicle, a type of material, a severity of the detected grade, or the like. Generally stated, it may be desirable and accordingly predetermined within the system that a lip of the material pile upon discharge overlaps with the edge of the grade by a specified minimal distance.

With sufficient information received from the user interface 214 or otherwise derived from the user input in association with a target discharge location 30, the method 400 may continue in step 450 by transmitting output signals comprising data corresponding to the target discharge location 30 to a second user interface 314 associated with the transport vehicle 10.

In an embodiment, a smart mapping system as disclosed herein may comprise a common mapping interface associated with each user interface 214, 314 on the work machine 100 and on the transport vehicle 10, wherein selections made by an operator of the work machine 100 with respect to a target discharge location 30 are processed and transmitted in substantially real-time for visual implementation on the user interface 314 of the transport vehicle 10. With illustrative reference to FIG. 8, a target discharge location 30 is selected and shown with respect to an edge 22 of the existing grade 24.

In other embodiments, each of the vehicles 10, 100 has an independent mapping or other visual system associated with the worksite, in which case user inputs from the work machine 100 may be translated by a system as disclosed herein from a coordinate system relevant to the work machine (i.e., associated with the perspective of the operator when providing the user inputs via the user interface) into a coordinate system independent of the work machine, and then further as needed translated by the system into another coordinate system relevant to the transport vehicle (i.e., associated with the perspective of a driver of the transport vehicle via display unit 318 of the user interface 314 or otherwise for the specification of route instructions).

Figure 8:
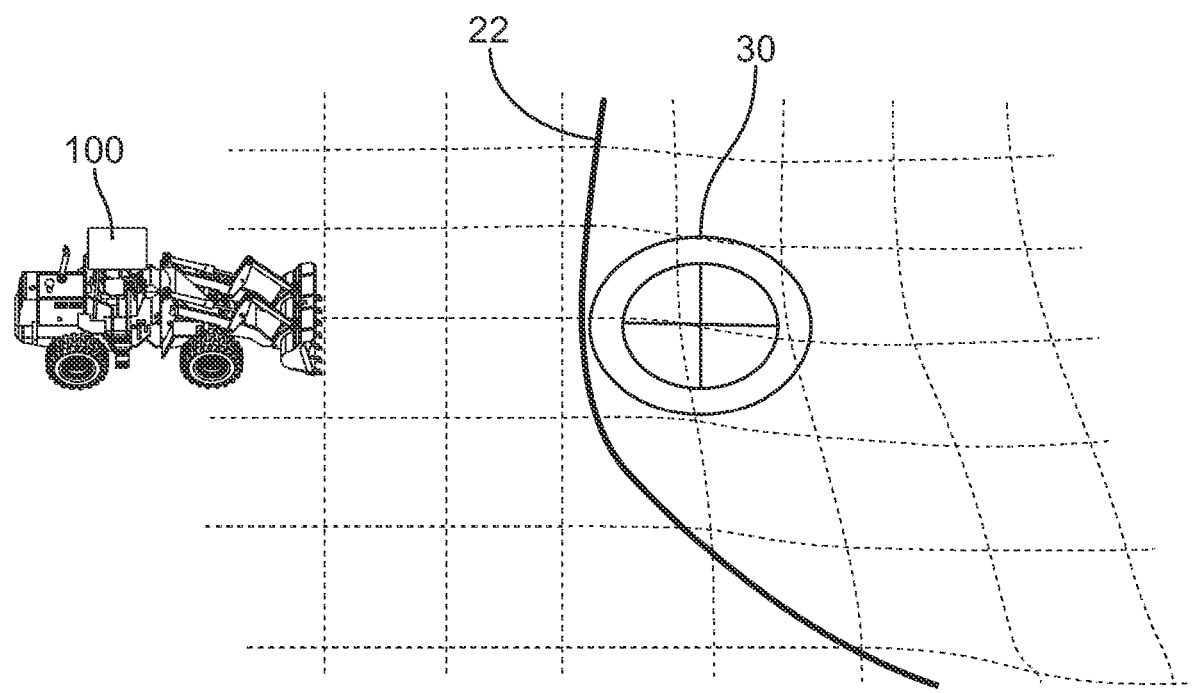
FIG. 8 is a perspective view representing a target discharge location for material relative to a grade in a worksite and in accordance with various embodiments of a system and method as disclosed herein.
Figure 9:
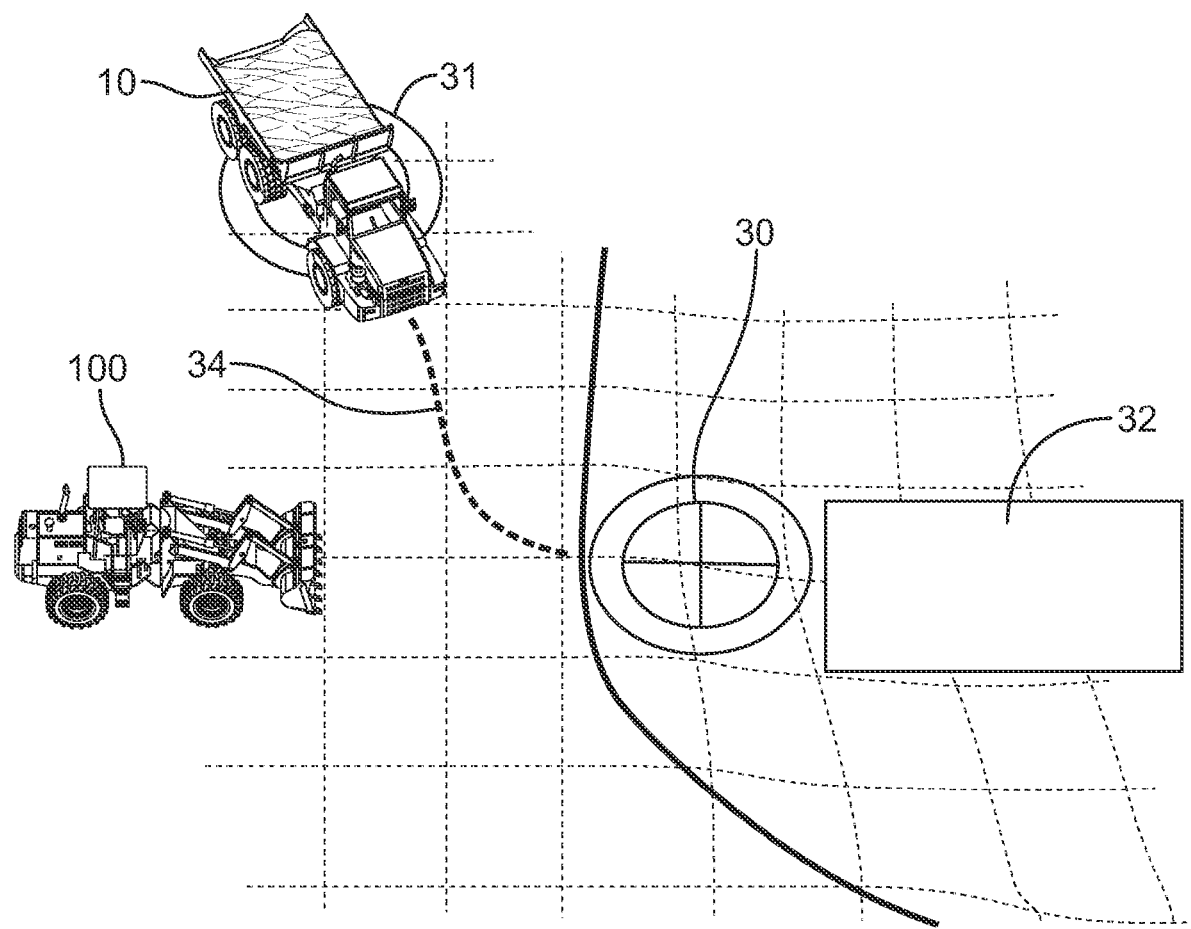
FIG. 9 is the perspective view of FIG. 8 further including a generated route for the transport vehicle in accordance with various embodiments of a system and method as disclosed herein.

In various embodiments, a target discharge location 30 as generated by the system and with illustrative reference back to FIG. 8 may further be accompanied by a target stopping location 32 for the transport vehicle 10 relative to the discharge location, such that material discharged from the transport vehicle will pile substantially within or otherwise appropriately with respect to the discharge location. The target stopping location 32 may for example be generated as a virtual three-dimensional area sized to encompass a transport vehicle 10 and loading container 14, as represented in FIG. 9. The target stopping location 32 may be determined based at least in part on a type, elevation, length, etc., of the transport vehicle 10 and loading container 14 and optionally further in view of a size of the load 20 being carried, a type of material in the load 20, etc. For example, certain loads may be expected to spread more or less than other loads upon discharge and accordingly require varying distances between the target discharge location 30 and the target stopping location 32.

In step 460, the driver of the transport vehicle 10 is provided with data corresponding to a route 34 generated by the system, including position targeting outputs in the form of for example instructions displayed via the respective worksite mapping unit of the transport vehicle or via the common ("smart") mapping system of the vehicles collectively. The route 34 may preferably be determined to account for any intervening terrain and associated objects between the target discharge location 30 and/or target stopping location 32 and the current position of the transport vehicle 10.

As a prerequisite for generation of the map and route 34 for the transport vehicle 10, the system may first need to detect or otherwise determine a current location 31 of the transport vehicle 10, for example using GPS data. Alternatively, information corresponding to a distance between the transport vehicle 10 and the work machine 100 may be provided using a beacon transmitter or RFID tag as described above, or contours of the loading container 14 may be visually identified using collected image data from the one or more image data sources 204 associated with the work machine 100 as described above and further processed to determine a current distance, orientation, etc. In one embodiment, an imaging routine may include processing of stereo camera disparity measurements and stored or otherwise developed models in order to segment respective measurements into a floor plane associated for example with a loading surface, loading container sidewalls, a top edge, and the like, wherein said processing may account for a position, orientation, moving speed, etc., of the image data source 204. Segmentation may in some embodiments be further improved via the machine-readable identifier 332 or other machine-readable information (e.g., printed text, barcodes, etc.) or objects within the image frame. In embodiments where multiple image data sources 204 may be utilized, a known relative position and orientation of the image data sources 204 may further enable object position determination through for example triangulation techniques. Briefly stated, the controller 212 and/or a discrete image processing unit (not shown) may for example utilize conventional image recognition and processing techniques, floor plane modeling, machine learning algorithms, stored loading area data, and the like to analyze the shape and size of an object (e.g., the loading container), to measure a distance to the object from the stereo camera, to identify or predict the extent of the object in the image frame, to measure the orientation of the object in the image frame, and to convert the measurements from the image frame into the work machine frame.

In one example, the driver of the transport vehicle 10 may simply follow visual indicators generated on the displayed map and follow a displayed route 34 or, using for example a back-up camera system, line up the sight to a specified parking location relative to the target stopping location 32 where a current load 20 should preferably be dumped/discharged. As previously noted, the targeting system may preferably line up the discharged load 20 of material so that the lip 22 of the discharged pile overlaps (by a predetermined or otherwise minimal distance) the edge of the grade 24. Such an embodiment may in an embodiment include coordination of the controller 212 associated with the work machine 100 and the controller 312 associated with the transport vehicle 10, for example via bidirectional data communication using a communications network. For example, using an overhead (i.e., top-down) view or a front camera view as a first image layer displayed on the onboard user interface 314 via display unit 318, a superposed second image layer may be generated to inform the driver of the transport vehicle 10 of information corresponding to the determined route 34, the target discharge location 30, the target stopping location 32, and/or the like, wherein the driver simply drives at least the loading container 14 into position.

In another example, an automated dumping control mode (step 460) may optionally be provided wherein the transport vehicle 10 is at least partially controlled to direct movement of at least the loading container thereof to a specified target stopping location 32 relative to the target discharge location 30. Such an embodiment may for example include coordination of the controller 212 associated with the work machine 100 and the controller 312 associated with the transport vehicle 10, for example via bidirectional data communication using a communications network. As one example, when the transport vehicle 10 has reached a specified or threshold distance from the target discharge location 30 and/or target stopping location 32, the output signals are received by the controller 312 of the transport vehicle 10 to inform the driver that an auto-park system is available for the remaining portion of the determined route 34. The operator may then acknowledge activation of the auto park mode, for example via the onboard user interface 314, wherein a steering control system 330 for the transport vehicle automatically takes over steering using control data associated with or otherwise derived from the output signals from the work machine controller 212. In various embodiments, the driver may still be responsible for one or more driving aspects, including for example braking, even during the auto-park mode but a fully autonomous feature may also be contemplated within the scope of the present disclosure.

In an embodiment, the image data source 204 of the work machine 100 and/or other sensors or alternative inputs such as for example from the payload weighing unit 322 of the transport vehicle 10 may be implemented to estimate a volume of material required to fill at least a portion of the worksite, and/or a volume of material currently or previously discharged in one or more locations relative to the at least a portion of the worksite. This may account for example on the relative elevation of low portions of the unfilled portion of the worksite with respect to completed portions, and further accounting in some embodiments for changes in the scanned terrain from before grading to after grading (i.e., upon light compaction).

The system and method 400 may further optionally include estimating a volume of carryback material remaining in a loading container of the transport vehicle 10 after a material discharge with respect to the one or more locations relative to the at least a portion of the worksite, and accounting for the estimated volume of carryback material in estimating the volume of material discharged in the one or more locations relative to the at least a portion of the worksite. For example, one or more image data sources 304 mounted on the transport vehicle 10 may be configured to scan a bottom of the loading container 14 when the loaded material has theoretically been fully discharged, wherein a profile of the remaining material relative to an expected profile for the empty loading container may be processed to estimate the carryback material. As previously noted, image data sources 304 as disclosed herein may include radar, lidar, and equivalent sensing units that can generate point clouds of data as opposed to just conventional images. The carryback estimation algorithm may optionally further account for inputs from the payload weighing unit 322.

Volume estimations as noted above, for the amounts being discharged by the transport vehicles 10 relative to an expected amount, or for an amount of material required to fill at least a relevant portion of the worksite, may optionally be provided as inputs (step 435) with respect to the driver assistance inputs on the user interface 314 via display unit 318 of the transport vehicle 10, for example to account for a size of the expected discharge if/when dynamically modifying the target discharge location 30, or to potentially change a relative priority among a selected plurality of target discharge locations 30.

Such volume estimations may also, or in the alternative, be provided as inputs (step 435) with respect to the automated discharge control mode of step 460, for example to account for a size of the expected discharge if/when dynamically modifying the target discharge location 30, or to potentially change a relative priority among a selected plurality of target discharge locations 30.

Figure 10:
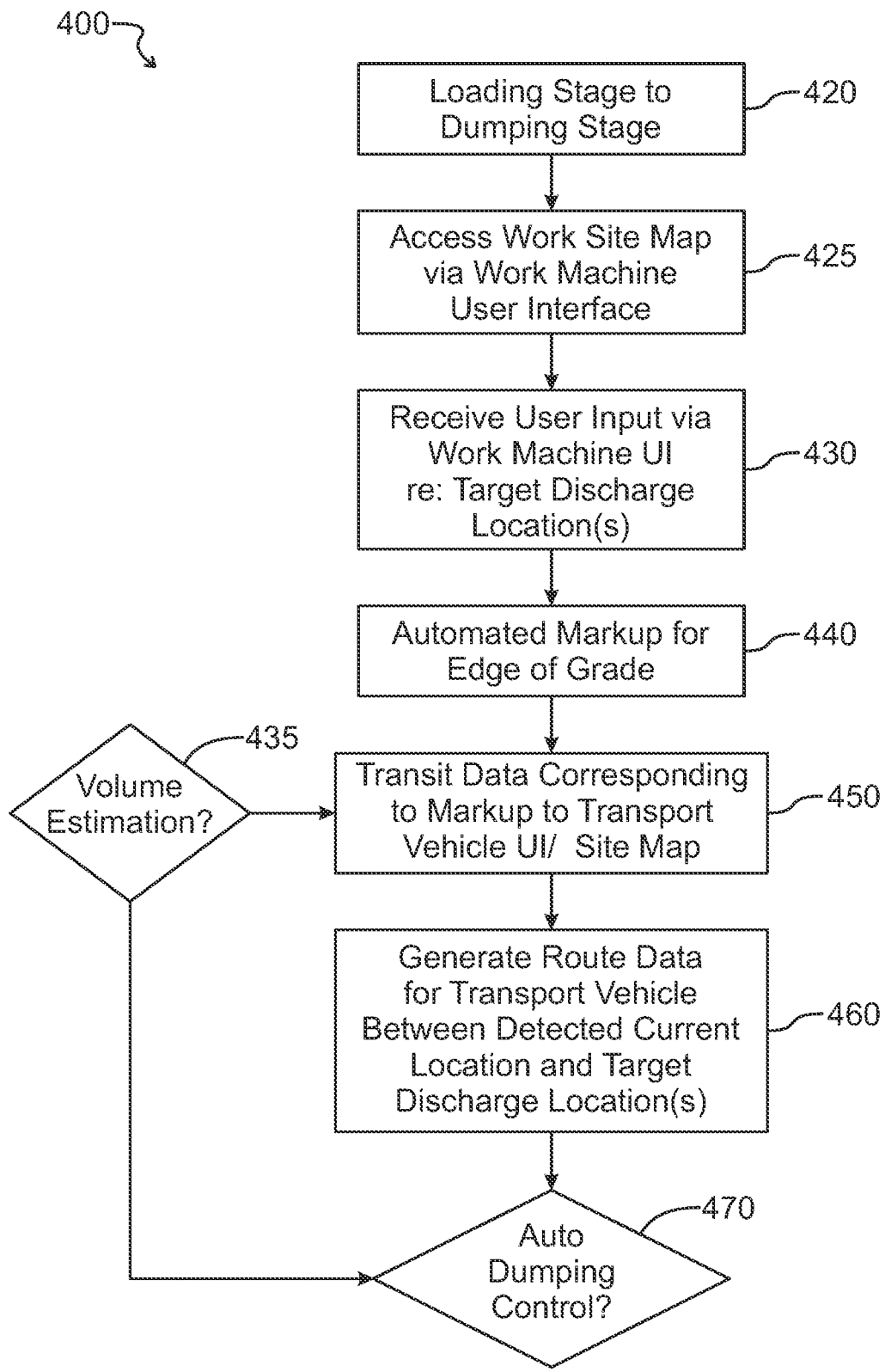
FIG. 10 is a flowchart representing an exemplary embodiment of a method as disclosed herein.
Figure 11:
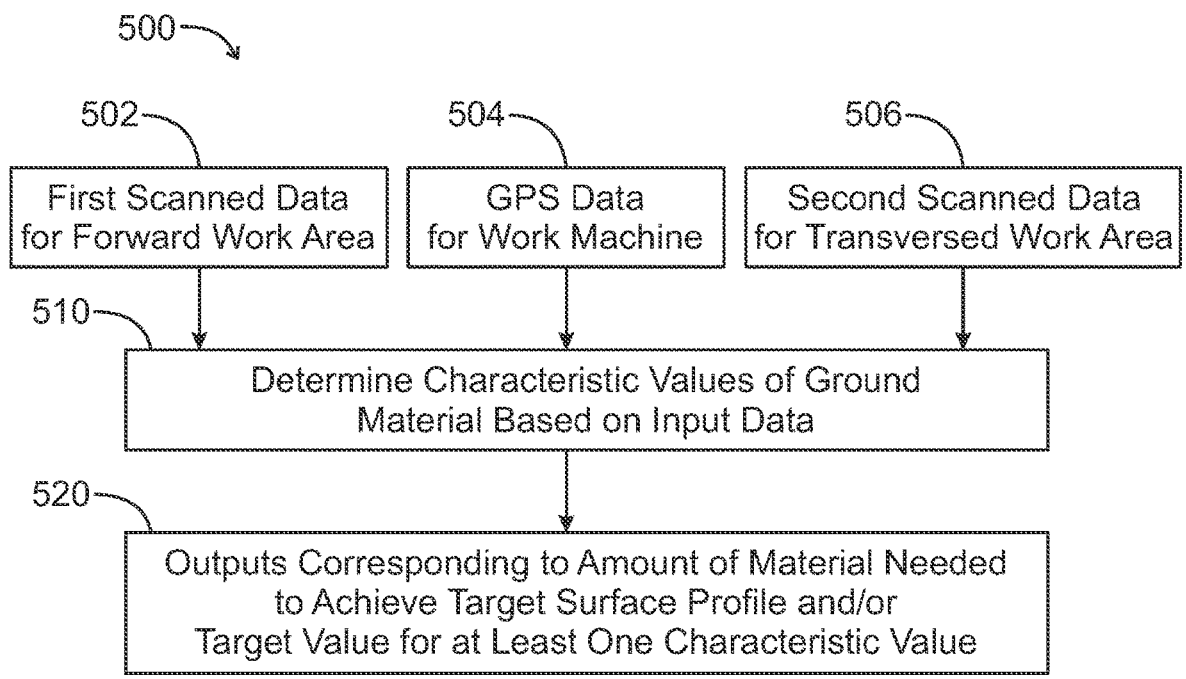
FIG. 11 is a flowchart representing exemplary steps according to an alternative embodiment of the method of FIG. 10.

Referring next to FIG. 11, an embodiment of a method 500 or sub-process may be further described for determining an amount of material required to fill at least a relevant amount of the worksite, according to for example step 435 of the method 400 in FIG. 10. The method 500 includes at least a step 510 of determining characteristic values of ground material in a worksite based on various inputs, substantially in real-time.

One set of inputs may be provided as first data 502 of a surface in a forward work area or otherwise stated a forward portion of the worksite. In various embodiments, the first data 502 may be provided via surface scans of the forward work area. The term "forward work area" or equivalents as used herein may refer for example to at least a portion of the worksite generally in front of the work machine 100 when the work machine is travelling in a forward direction. As previously noted, the scanned data may be provided via an image data source (e.g., stereo camera), optical sensor, radar sensor, etc. The first data 502 as collected in the forward portion of the worksite may include for example a collection of surface scan data prior to a discharge of loose fill material in the forward work area and a collection of surface scan data after discharge of the loose fill material in the forward work area.

Another set of inputs may be provided as second data 506 of a surface in a traversed work area or otherwise stated a traversed portion of the worksite. In various embodiments, the second data 506 may be provided via surface scans of the traversed work area. The term "traversed work area" or equivalents as used herein may typically refer for example to at least a portion of the work area generally rearward of the work machine when the work machine is travelling in a forward direction and having been traversed by the work machine. The sensor(s) providing the second scanned data 506 may be different from the sensor(s) providing the first scanned data 502, or they may include one or more overlapping sensors.

Another (or an alternative) set of inputs may be provided as position data 504 from a position sensor such as for example a GPS transceiver mounted or otherwise provided on the work machine 100. The position data 504 may for example be utilized with corresponding first surface scan data 502 to determine a current elevation of the work machine 100 relative to a surface forward of the work machine, and/or may be utilized with corresponding second surface scan data 506 to determine a current elevation of the work machine 100 relative to a surface previously traversed by the work machine.

Relative elevation ($\Delta z$) values may be utilized among other inputs to determine the characteristic values of the ground material, as an indication for example of the swell factor, compaction ratio, or the like for a particular surface upon which for example the work machine has traversed.

In at least one particular example wherein the work machine 100 is a drum roller compactor or an equivalent, a surface scanning sensor may be utilized to generate surface scan data 502 while a position sensor is utilized to generate position data 504, without requiring a separate surface scanning sensor or the equivalent for generating data 506 in the traversed work area. The forward scan along with high precision GPS signals and known work machine body kinematics may be sufficient to determine a surface height of the rear drum (as being the last point wherein the work machine 100 contacts the ground surface and therefore equating to the elevation of the traversed work area) and therefore to determine the compaction ratio.

The various data points may in various embodiments be provided as time-series data or the like, wherein for example first scanned data 502 and corresponding second scanned data 506 for the same portion of the ground surface may be directly compared and processed by the system based on for example a ground speed of the work machine to match the respective data.

Figure 7:
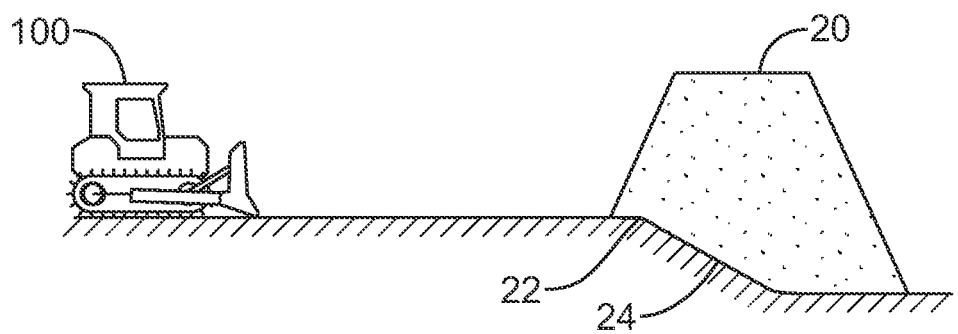
FIG. 7 is a graphical diagram representing a pile of material discharged in one example of an appropriate location relative to the grade.

In another step 520 of the method 500, output signals may be provided corresponding to an amount of material needed to be added for achieving one or more targets in the work area. Referring to the simplified diagram of a worksite as illustrated in FIG. 7, a work machine 100 may traverse a compacted ground surface of the worksite, a portion of which is prior to the loose fill 20 and may generally correspond to a desired or target surface profile. A volume difference between the current ground surface and the target surface profile will need to be filled, for example by operations including the spreading and compacting of the loose fill 20. In the illustrated example, the loose fill 20 is discharged over a slope 24 between the portion of the compacted ground surface corresponding to the target surface profile and a portion of the current ground surface that still needs to be filled, and further overlaps with an upper lip 22 of the slope 24 of the surface. By scanning the relevant areas prior to traverse by the work machine (e.g., dozer, roller), further scanning the same areas after traverse, and making calculations substantially in real-time with respect to the second scans for a given area, relevant characteristics of the spread and (at least lightly) compacted surface may be determined and utilized for important further estimations. Otherwise stated, in various embodiments a system as disclosed herein may be capable of measuring any number of surface characteristics as are conventionally known (e.g., bank yardage, swell factor, compaction factor), as well as any number of derivative characteristics therefrom, but the calculations may be made substantially in real-time upon traversal of the ground when utilizing the multiple surface scan inputs as disclosed herein and further dynamically updating estimates based on for example current scan results as opposed to predicted scan results.

Figure 12:
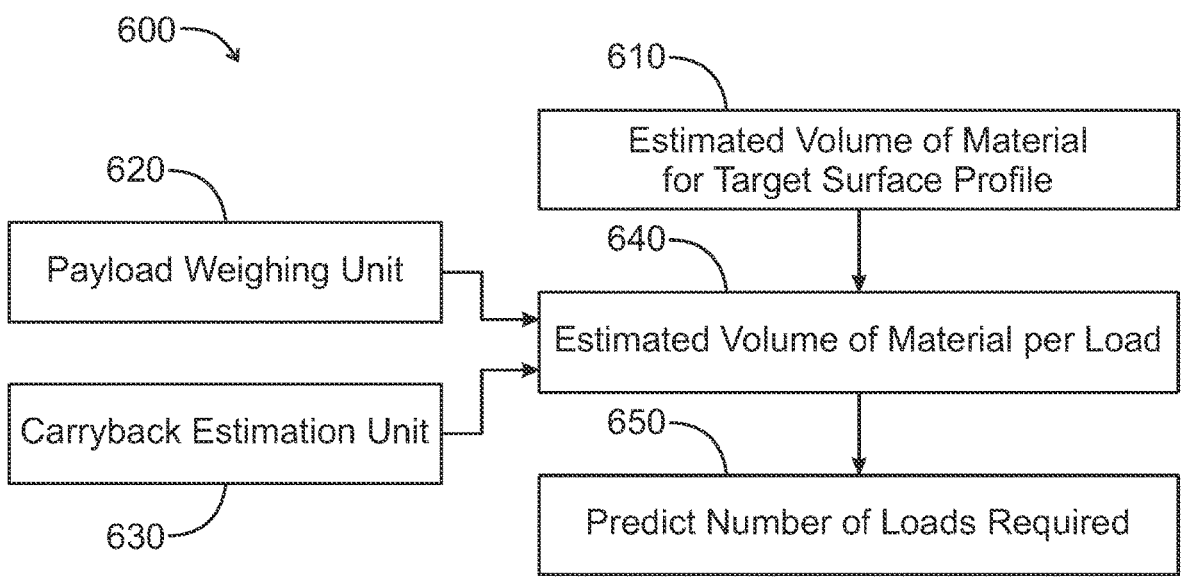
FIG. 12 is a flowchart representing exemplary steps according to an alternative embodiment of the method of FIG. 10.

In another exemplary embodiment as disclosed herein and as represented in FIG. 12, a method 600 according to step 435 of the method 400 and as further enabled by the system configuration described above includes estimating (step 610) a volume of material required to achieve a target surface profile for a work area, estimating (step 640) a volume of material that is transported to the work area on a per load basis, and accordingly predicting (step 650) a number of transport vehicle loads that will be required to achieve the target surface profile. The initial estimates may for example be provided in view of current surface scans (and/or input data from a topographic map of the worksite) and further in view of conventional mathematical models and assumptions, but the accuracy of these estimates may be improved over time with real-time feedback comprising comparisons of the ground surface before it was traversed by the work machine 100 to the same ground surface afterwards.

In an embodiment, the estimated volume of material that is transported with each load may be estimated without any feedback from the transport vehicles. For example, after numerous iterations it may be mathematically determined how much an initial estimated volume of material required differs from a current estimated volume of material required, further in view of the number of loads transported.

The estimated volume of material that is transported with each load may however in other embodiments further account for inputs from the transport vehicle itself, such as for example via a payload weighing or measuring unit as is known in the art. Volume estimations directly based on inputs from a payload weighing or measuring unit 322 (step 620) may lack a high degree of accuracy on their own, given for example the uncertainty regarding the state/density of the material as it is being transported, but in various embodiments may usefully be implemented among other inputs or as a confirmation of other inputs. As another example, inputs from the payload weighing or measuring unit 322 after discharge of material may be provided for carryback estimation (step 530) as part of the overall volume estimation, in other words such that a remaining amount of material in the loading container after discharge is accounted for in the volume estimation. Material carryback may further or in the alternative be estimated based on scans of the loading container as compared to a known profile of the loading container when completely empty.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of assisted discharge by a transport vehicle of material to be worked at a worksite by a work machine, the method comprising:
   accessing a map via a first user interface associated with the work machine, the map comprising three-dimensional data corresponding to at least a portion of a worksite to be worked;
   receiving user input via the first user interface corresponding to one or more selected discharge locations in the at least a portion of the worksite to be worked;
   automatically determining an overlap of a respective lip of a material pile to be discharged with respect to a detected edge of a grade associated with the at least one selected discharge location, and conditionally correcting the at least one selected discharge location based thereon; and
   generating output signals for modifying a display on a second user interface associated with the transport vehicle, said modifying of the display corresponding to the received user input and for directing the transport vehicle to a target stopping location relative to at least one of the one or more selected discharge locations.

2. The method of claim 1, wherein the received user input comprises at least one priority indicator with respect to each of the one or more desired discharge locations.

3. The method of claim 1, wherein each of the first user interface and the second user interface are linked to a common mapping unit, and wherein user input provided with respect to the accessed map via the first user interface is provided substantially in real-time with respect to the accessed map via the second user interface, wherein each of the first user interface and the second user interface shares at least a common modified portion of a display thereon.

4. The method of claim 1, further comprising generating a route for the transport vehicle between a detected current location and the at least one of the one or more desired discharge locations, and wherein the generated output signals correspond at least in part to the generated route.

5. The method of claim 4, wherein:
the user input is received in association with a first mapping unit and translated into first position data in a coordinate system independent of the work machine,
the first position data is converted into second position data in a coordinate system associated with the transport vehicle, and
the second user interface displays the generated route using the second position data and in association with a second mapping unit.

6. The method of claim 4, wherein the route is generated based at least in part on received user input comprising at least one priority indicator with respect to each of the one or more desired discharge locations.

7. The method of claim 6, wherein the route is generated further based at least in part on a detected payload weight.

8. The method of claim 1, further comprising estimating a volume of material required to fill at least a portion of the worksite, and/or a volume of material discharged in one or more locations relative to the at least a portion of the worksite.

9. The method of claim 8, further comprising:
estimating a volume of material added to the at least a portion of the worksite per transport vehicle load; and
predicting a number of transport vehicle loads required to fill the at least a portion of the worksite.

10. The method of claim 9, wherein the one or more desired discharge locations in the at least a portion of the worksite to be worked are predicted based at least in part on the predicted number of transport vehicle loads required to fill the at least a portion of the worksite.

11. The method of claim 8, wherein the volume of material required to fill at least a portion of the worksite is estimated at least in part by:
collecting first data for at least a forward portion of the worksite via surface scans by at least a first sensor onboard the work machine;
collecting second data for at least a traversed portion of the worksite via surface scans by at least a second sensor onboard the work machine;
determining one or more characteristic values of a ground material in the work area based on at least first data for a specified area and corresponding second data for the specified area; and
estimating the volume of material required to fill the at least a portion of the worksite based on at least one of the one or more characteristic values.

12. The method of claim 8, wherein the volume of material required to fill at least a portion of the worksite is estimated at least in part by:
collecting surface scan data for at least a forward portion of the worksite via at least a first sensor onboard the work machine;
collecting position data for at least a traversed portion of the worksite via at least a second sensor onboard the work machine;
determining one or more characteristic values of a ground material in the work area based on at least surface scan data for a specified area and corresponding position data for the specified area; and
estimating the volume of material required to fill the at least a portion of the worksite based on at least one of the one or more characteristic values.

13. The method of claim 8, further comprising estimating a volume of carryback material remaining in a loading container of the transport vehicle after a material discharge with respect to the one or more locations relative to the at least a portion of the worksite, and accounting for the estimated volume of carryback material in estimating the volume of material discharged in the one or more locations relative to the at least a portion of the worksite.

14. The method of claim 8, further comprising automatically correcting the at least one desired discharge location further based on an estimated size of a load carried by the transport vehicle and/or the estimated volume of material required to fill the at least a portion of the worksite.

15. A system for assisted discharge by a transport vehicle of material to be worked at a worksite by a work machine, the system comprising:
an image data source configured to generate image data corresponding to at least a portion of a worksite to be worked;
a first user interface associated with the work machine, and configured to selectively access and display a first map comprising three-dimensional data corresponding to the at least a portion of a worksite to be worked, said first user interface further configured to enable selection of one or more desired discharge locations in the at least a portion of the worksite to be worked;
a second user interface associated with the transport vehicle, and configured to display at least images corresponding to the at least a portion of a worksite to be worked; and
at least one controller functionally linked to the image data source, the first user interface and the second user interface, and configured to
automatically determine an overlap of a respective lip of a material pile to be discharged with respect to a detected edge of a grade associated with at least one of the one or more selected discharge locations, and conditionally correcting the at least one of the one or more selected discharge locations based thereon, and
generate output signals for modifying the displayed images on the second user interface, said modifying of the displayed images corresponding to user input received via the first user interface and for directing the transport vehicle to a target stopping location relative to at least one of the one or more selected discharge locations.

16. The system of claim 15, wherein each of the first user interface and the second user interface are linked to a common mapping unit, and wherein user input provided with respect to the accessed map via the first user interface is provided substantially in real-time with respect to the accessed map via the second user interface, wherein each of the first user interface and the second user interface shares at least a common modified portion of a display thereon.

17. The system of claim 15, wherein the controller is configured to generate a route for the transport vehicle between a detected current location and the at least one of the one or more desired discharge locations, and wherein the generated output signals correspond at least in part to the generated route.

18. The system of claim 17, wherein the route is generated based at least in part on received user input comprising at least one priority indicator with respect to each of the one or more desired discharge locations.

19. The system of claim 15, wherein the controller is configured to further estimate a volume of material required to fill at least a portion of the worksite via the image data received from the image data source, and/or a volume of material discharged in one or more locations relative to the at least a portion of the worksite.

20. The system of claim 19, wherein the controller is configured to further estimate a volume of material added to the at least a portion of the worksite per transport vehicle load, and predict a number of transport vehicle loads required to fill the at least a portion of the worksite, wherein the one or more desired discharge locations in the at least a portion of the worksite to be worked are predicted based at least in part on the predicted number of transport vehicle loads required to fill the at least a portion of the worksite.

* * * * *